US012356151B2

(12) United States Patent
Goldin et al.

(10) Patent No.: US 12,356,151 B2
(45) Date of Patent: Jul. 8, 2025

(54) METHOD OF SUPPRESSING UNDESIRED NOISE IN A HEARING AID

(71) Applicant: Alango Technologies, Tirat Karmel (IL)

(72) Inventors: Alexander Goldin, Haifa (IL); Ishay Berkovich, Haifa (IL); Alex Radzishevsky, Haifa (IL)

(73) Assignee: Alango Technologies, Tirat Karmel (IL)

( * ) Notice: Subject to any disclaimer, the term of this patent is extended or adjusted under 35 U.S.C. 154(b) by 265 days.

(21) Appl. No.: 18/203,506

(22) Filed: May 30, 2023

(65) Prior Publication Data

US 2023/0396939 A1 Dec. 7, 2023

Related U.S. Application Data

(60) Provisional application No. 63/348,051, filed on Jun. 2, 2022.

(51) Int. Cl.

| | |
|---|---|
| ***H04R 25/00*** | (2006.01) |
| ***G10K 11/16*** | (2006.01) |
| ***H04R 3/00*** | (2006.01) |

(52) U.S. Cl.

CPC ........... *H04R 25/505* (2013.01); *G10K 11/16* (2013.01); *H04R 3/005* (2013.01); *H04R 25/554* (2013.01); *H04R 2430/03* (2013.01)

(58) Field of Classification Search

CPC ...... G10K 11/16; H04R 25/505; H04R 3/005; H04R 25/554; H04R 2430/03; H04R 2410/05; H04R 25/407

See application file for complete search history.

(56) References Cited

U.S. PATENT DOCUMENTS 10,438,605 B1 * 10/2019 Ganeshkumar ........ H04R 5/033
11,930,333 B2 * 3/2024 Li ............................ H04R 3/04

* cited by examiner

*Primary Examiner* — Brian Ensey

(74) *Attorney, Agent, or Firm* — Patentagar PLLC; Alexander Rabinovich

(57) ABSTRACT

The invention relates to a method of suppressing undesired noise in a hearing aid, the hearing aid comprising a handheld unit, in which a microphone is integrated, and another microphone located externally of the handheld unit and connected thereto. The method includes the steps of converting a signal from the integrated microphone and a signal from the external microphone into digital signals; dividing the digital signal from the integrated microphone and the external microphone into frequency sub-bands, computing the current spectral amplitude of the integrated microphone sub-band signal and the current spectral amplitude of the external microphone sub-band signal; computing the ratio of the current spectral amplitude of the external microphone sub-band signal to the current spectral amplitude of the integrated microphone sub-band signal; modifying the integrated microphone sub-band signal according to the calculated ratio; and computing a full-band output signal from the integrated microphone sub-band signals.

20 Claims, 2 Drawing Sheets

METHOD OF SUPPRESSING UNDESIRED NOISE IN A HEARING AID

CROSS-REFERENCE TO RELATED APPLICATIONS

The present non-provisional application is based on U.S. provisional application 63/348,051 filed Jun. 2, 2022, the provisional application being hereby incorporated by reference in its entirety.

BACKGROUND OF THE INVENTION

1. Field of the Invention

The invention relates to a method of suppressing undesired noise in a hearing amplification device, generally referred to as a hearing aid, that makes sound audible to a person with hearing loss. More specifically, the invention relates to such a method in a hearing aid comprising a handheld unit in which a microphone is integrated. Hearing aids of this kind are typically equipped with a headset connected to the handheld unit by wired or wireless connection.

Hearing loss is a partial inability to hear. Hearing loss may be present at birth or acquired at any time afterwards. Hearing loss may be caused by a number of factors, including genetics, ageing, exposure to noise, some infections, birth complications, trauma to the ear, and certain medications or toxins. Untreated hearing loss results in lower quality of life.

Hearing aids are devices intended to amplify sounds for people compensating for the impaired ear sensitivity due to the hearing loss. There are various types of hearing aids such as Behind The Ear, In The Ear, Completely in Channel and others. One type specifically useful for elderly users, users with dexterity problems or users with some level of dementia consists of body-warn or hand-held unit connected to an audio headset by a wire. The unit generally integrates at least one microphone, amplification circuit, batteries, and device controls.

Hearing aids comprising a handheld unit in which a microphone is integrated may suffer from noise generated by the handling of the device. Handling noise may be acoustic when the user accidentally touches microphone ports. Handling noise may also be mechanical caused by the friction of user's fingers and the device body, e.g., while operating the device controls. Friction may also be due to the device movement relative to user's clothes. Such friction causes the device body vibration that is transferred to the corresponding vibration of the internal microphone's membranes. In both cases, these noises degrade the microphone signal quality and result in undesired artifacts.

Due to the high level of amplification inherent to hearing aids, the handling noise is further amplified creating a high degree of unpleasant and harsh artifacts in the output signal that may render the device unusable or harmful to the user. Accordingly, there is a need for a method of suppressing the amplification of the handling noise in a hearing aid.

2. Description of the Related Art

A hearing aid with a double-microphone system is known from CN 102843638 A (Wang Nan). The double-microphone system can reduce environment input noise but is ineffective in suppressing handling noise.

A hearing aid comprising an integrated microphone, and a method of suppressing handling noise are known from US 2022/303694 A1 (Sun et al). The method includes attenuating the microphone signal "at times when undesired sounds are sensed," simultaneously, by the microphone and the accelerometer. This means that the quality of the microphone signal may be degraded. Moreover, a typical hearing aid does not contain an accelerometer, so that the hearing aid utilizing the method taught by Sun et al, is more complex and expensive.

SUMMARY OF THE INVENTION

The object of the invention is providing a method of suppressing undesired handling noise in a hearing aid without affecting the quality of the resulting signal. A further object is providing a method of suppressing undesired handling noise, which can be implemented in a hearing aid that does not require additional means making the device more complex and expensive.

Disclosed herein is a method of suppressing undesired noise in a hearing aid comprising a handheld unit in which a microphone is integrated, the hearing aid further comprising another microphone located externally of the handheld unit and connected thereto. The hearing aid comprises a processor adapted for receiving signal from the microphones. It is understood by those skilled in the art that the steps listed below are preferably performed using that processor which is pre-programmed accordingly. The method can also be implemented using hardware elements and blocks known in the art. The method includes the steps of:

a) receiving analog signals generated by said integrated and said external microphones;
b) converting a signal from an integrated microphone and a signal from an external microphone, respectively, into digital signals;
c) dividing the digital signal from the integrated microphone into frequency sub-bands, and thus obtaining integrated microphone sub-band signals;
d) dividing the digital signal from the external microphone into frequency sub-bands, and thus obtaining external microphone sub-band signals;
e) in each frequency sub-band, computing a current spectral amplitude of the integrated microphone sub-band signal and a current spectral amplitude of the external microphone sub-band signal;
f) computing the ratio of the current spectral amplitude of the external microphone sub-band signal to the current spectral amplitude of the integrated microphone sub-band signal;
g) modifying the integrated microphone sub-band signal according to the calculated ratio;
h) synthesizing a full-band output signal from the integrated microphone sub-band signals.

One way of modification of the integrated microphone sub-band signal is attenuation of this signal. The attenuation may be effected in each sub-band in which said ratio of the current spectral amplitudes exceeds a threshold. The threshold can either be predefined or calculated dynamically.

Alternatively, the modification of the integrated microphone sub-band signal may consist of mixing this signal with the external microphone sub-band signal in each sub-band in which said ratio of the current spectral amplitude exceeds a threshold.

The signals can be mixed by a mixing coefficient calculated according to the ratio of the current spectral amplitudes, and the threshold. As in the above case, the threshold can either be predefined or calculated dynamically. The mixing coefficients reflect the strength of the handling noise relative to the acoustic signal in each sub-band. The more handling noise is detected, the more the external microphone signal substitutes the integrated microphone signal.

In a further embodiment, both ways of modification can be utilized, i.e., the integrated microphone sub-band signal is mixed with the external microphone sub-band signal in parallel with the attenuation as described above. In this case the handling noise is suppressed most effectively.

It is essential that the attenuation of the integrated microphone signal affected by the handling noise does not lead to degraded quality of the resulting signal because this signal is substituted by unaffected signal from the external microphone. Thus, the above steps result in an output signal of good quality and free from the handling noise.

At least one additional microphone may by integrated in the handheld unit to provide a binaural effect (stereo sound). The signal from this additional integrated microphone is processed in the same way the signal from the above-mentioned integrated microphone is processed in order to suppress handling noise sensed by this additional microphone.

The external microphone can be included in a headset connected to the handheld unit, e.g. in a control box placed on the wire connecting the headset to the handheld unit. Otherwise, the external microphone can be built in a headset. This configuration is particularly suited in case the headset is connected to the handheld unit by wireless connection. However, it shall be clear to those skilled in the art that the presence of a headset is not essential for the method of the invention, and the external microphone can be as it is, connected to the handheld unit.

BRIEF DESCRIPTION OF THE DRAWINGS

Following is a description by way of example only of embodiments of the present invention with reference to the drawings in which.

DETAILED DESCRIPTION

Figure 1:
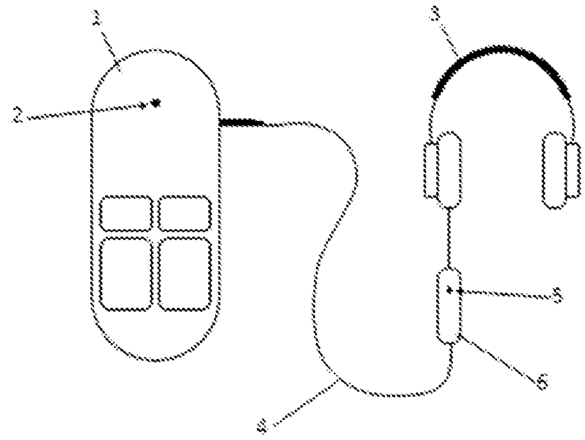
FIG. 1 presents a schematic view of a hearing aid in which the method of the invention can be implemented.

Presented in FIG. 1 is an example of a hearing aid in which the method of the invention can be implemented. The hearing aid comprises a handheld unit 1 in which a microphone 2 is integrated. The hearing aid further comprises a headset 3 connected with the handheld unit by a wire 4. An external microphone 5 is included in a control box 6 placed on the wire 4. Alternatively, the external microphone 5 can be built in the headset 3. This configuration (not shown in the drawings) is particularly suited in case the headset 3 is connected to the handheld unit 1 by a wireless connection. However, it shall be clear to those skilled in the art that the presence of a headset is not essential for the method of invention, and the external microphone can be as it is, connected to the handheld unit 1. The description below relates to configuration with one integrated microphone. The handheld unit 1 can include an additional integrated microphone (not shown) to provide a stereo sound. In this case one of the two integrated microphones is connected to the left earphone, and another microphone is connected to the right earphone.

When the user touches the handheld unit 1, it causes acoustical or mechanical noise of the large amplitude received by the microphone 2 integrated into the unit 1, while the external microphone 5 remains immune to this noise due to its being outside the unit 1.

Figure 2:
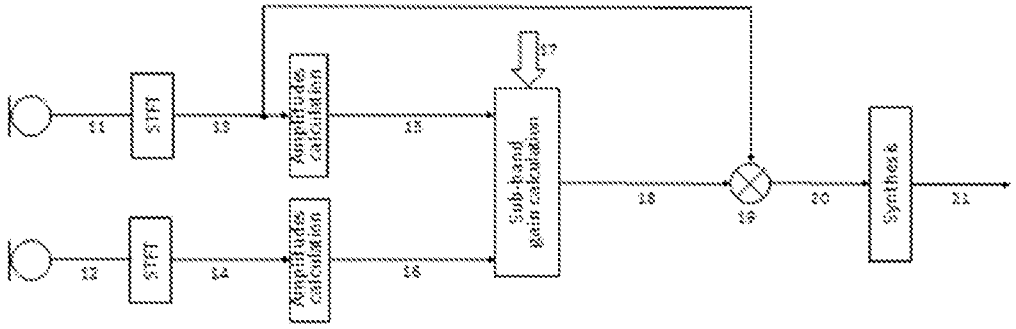
FIG. 2 presents a block diagram of the method of invention, based on attenuation of the signal affected by the handling noise.

A succession of steps constituting a block diagram of the method of invention, based on attenuation of the signal affected by the handling noise is shown in FIG. 2. According to this exemplary embodiment, the signal received from the integrated microphone and the signal received from the external microphone, respectively, are converted into an integrated microphone digital signal 11 and an external microphone digital signal 12. The digital signal 11, is further divided into a set of integrated microphone frequency sub-band signals 13, and the digital signal 12 is further divided into a set of external microphone frequency sub-band signals 14. Weighted Overlap Add (WOLA) method utilizing Short-Time Fourier Transform (STFT) can be used for sub-band analysis and synthesis. Alternatively, filter banks can be used.

The number of sub-bands may vary from 4 to 64. If sub-bands division is done by STFT, the bands are uniform in frequency and the bandwidth is FS/2/N. For the optimal algorithm performance, the frequency resolution shall be <=250 Hz which means that for 16 KHz sampling rate, the number of bands shall be >=32.

In each frequency sub-band, the current spectral amplitude 15 of the integrated microphone sub-band signal 13 and the current spectral amplitude 16 of the external microphone sub-band signal 14 are computed. Further, for each sub-band signal, the ratio of the current spectral amplitude of the external microphone sub-band signal to the current spectral amplitude of the integrated microphone sub-band signal is computed.

Attenuation of the integrated microphone sub-band signal is performed in each sub-band in which said ratio of the current spectral amplitudes exceeds an attenuation threshold 17. In the example presented in the drawings, the threshold 17 is predefined. Alternatively, the threshold can be calculated dynamically based on the analysis of the integrated microphone signal and external microphone signal. Sub-band gain attenuation 18 is calculated based on the current spectral amplitudes 15, 16. As shown in FIG. 2, integrated microphone sub-band signals 13 are multiplied by the sub-band gain attenuation 18 in a multiplier 19 to obtain output sub-band signals 20.

An example (for a sub-band b) of calculating the sub-band gain attenuation is given below.

$X_I(b)$—integrated microphone spectral value in the sub-band b $A_I(b)=|X_I(b)|$—integrated microphone spectral amplitude in the sub-band b $A_E(b)=|X_E(b)|$—external microphone spectral amplitude in the sub-band b $T_A(b)>1$—attenuation threshold of the sub-band b $$R(b) = \frac{A_E(b)}{A_I(b)} - \text{ratio of the amplitudes for the sub-band } b$$

GA(b)=min (1, TA(b)·R(b)—gain attenuation for the sub-band b

According to this formula, the gain attenuation will reduce the output sub-band spectral amplitude of band b so that it never exceeds $T_A(b) \cdot A_E(b)$. Since both the integrated and external microphones are in a relative proximity limited by the headset cable length, the spectral amplitudes of the corresponding sub-band signals for acoustic signals are similar, whereas $T_A(b)>1$ considers possible fluctuations. In real cases $1.5<T_A(b)<3$. Any handling noise sensed by the integrated microphone only will cause a significant amplitude difference exceeding $T_A(b)$ and causing the corresponding gain reduction. The effect of the gain reduction for the handing noise can be enhanced, for example, by modifying the gain as follows:

$$\overline{G}_A(b)=G_A(b)^D, D>1$$

Unit gains (no handling noise) are not affected. The more handling noise is present, the smaller the gain $G_A(b)$ and the more it will be reduced. Typical values for D are $1<D<4$
Accordingly, the output spectral values Y(b) are calculated as $$Y(b)=\overline{G}_A(b)\cdot X_I(b)$$

After the output sub-band signals 20 are produced as described above, they are converted into the full band output signal 21 by way of synthesis.

It is understood that the above calculations are given by way an example only. It shall be clear to those skilled in the art that spectral amplitudes can be smoothed in time and/or frequency by a low pass filter to improve the stability of the calculated gains and improve the output sound quality.

Figure 3:
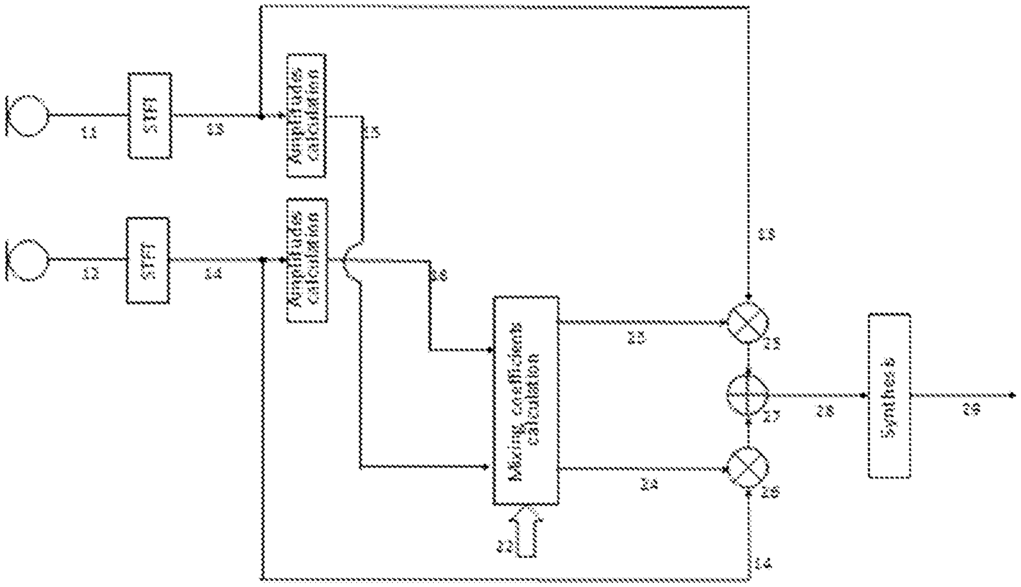
FIG. 3 presents a block diagram of the method of invention, based on mixing the signals affected by the handling noise.

Another embodiment of the method of invention, based on mixing the signals affected by the handling noise is shown on a block diagram in FIG. 3. As in the previous embodiment, the method includes converting microphone signals into digital signals dividing them to sub-band signals, computing the current spectral amplitudes of the microphone signals and their ratios. Further, the integrated microphone sub-band signal 13 is mixed with the external microphone sub-band signal 14 in each sub-band in which said ratio of the current spectral amplitudes exceeds a substitution threshold 22. In the example presented in the drawings, the threshold 22 is predefined. Alternatively, the threshold can be calculated dynamically based on the analysis of the integrated microphone signal and external microphone signal.

The signals 13, 14 are mixed according to mixing coefficients 23, 24, respectively. The mixing coefficients 23, 24 reflect the strength of the handling noise relative to the acoustic signal in each sub-band. The more handling noise is detected, the more the external microphone signal substitutes the integrated microphone signal. More specifically, the integrated microphone sub-band signals 13 are multiplied by the mixing coefficients 23 in a multiplier 25, while the external microphone sub-band signals 14 are multiplied by the mixing coefficients 24 in a multiplier 26. Resulting signals are mixed in an adder 27 to obtain output sub-band signals 28. After the output sub-band signals 28 are produced from the modified integrated and external microphone sub-bands as described above, they are converted into the full band output signal 29 by way of synthesis.

An example of calculating the mixing coefficients is given below.

$M_I(b)=\min(1, T_M(b)\cdot R(b))$—mixing coefficient for the integrated microphone sub-band b $$\overline{M}_I(b)=M_I(b)^D, D>$$

$$\overline{M}_E(b)=1-\overline{M}(b)$$

Accordingly, the output spectral values Y(b) are calculated as $$Y(b)=\overline{M}_I(b)\cdot X_I(b)+\overline{M}_E(b)\cdot X_E(b)$$

Figure 4:
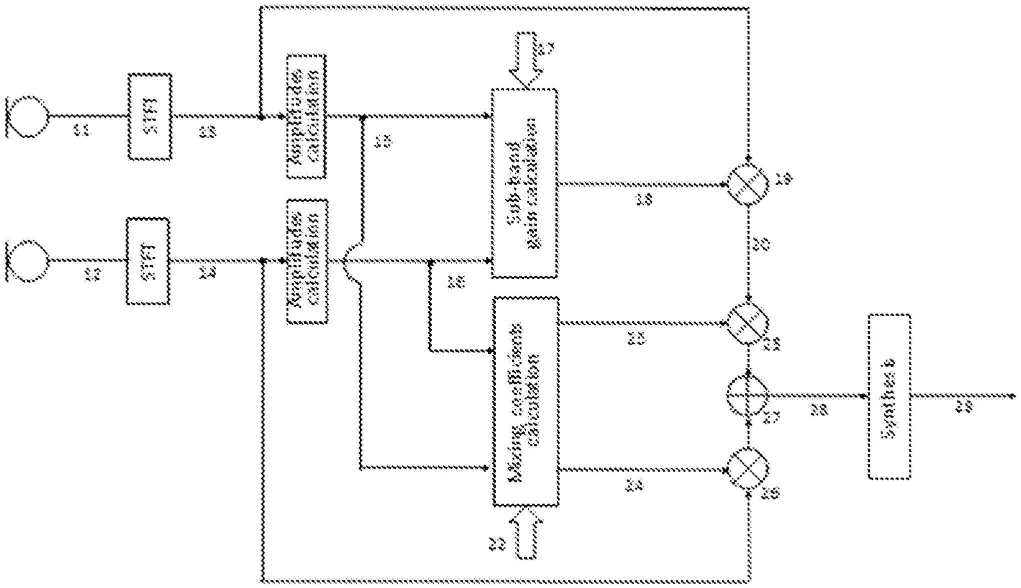
FIG. 4 presents a block diagram of the method of invention, using both attenuation and mixing.

A block diagram of the method of invention, using both attenuation and mixing is shown in FIG. 4. This embodiment differs from the method according to FIG. 3 in that, in parallel with the attenuation, the integrated microphone sub-band signal is mixed with the external microphone sub-band signal. To effect that, instead of the integrated microphone sub-band signals 13, the output sub-band signals 20 obtained by the attenuation according to FIG. 2 are multiplied by the mixing coefficients 23 in a multiplier 25. The output sub-band signals are computed as $$Y(b)=\overline{M}_I(b)\cdot\overline{G}_A(b)\cdot X_I(b)+\overline{M}_E(b)\cdot X_E(b)$$

As mentioned above, sub-bands division is done by Fourier Transform performed by means of processor. However, this step can be performed by a hardware device with the same result. For example, sub-bands division is typically performed in audio equalizers. Known in the art is audio equalizer using Fourier Transform in its operation (see, e.g., US 2018191531). Thus, the steps of sub-bands division illustrated in FIGS. 2-4 by blocks denoted STFT may be performed by a hardware device operating in a similar manner. It shall be understood by those skilled in the art that any other step of the disclosed method can be performed by a respective hardware device.

The invention claimed is:

1. A method of suppressing undesired noise in a hearing aid comprising a handheld unit in which a microphone is integrated, the hearing aid further comprising another microphone located externally of the handheld unit and connected thereto, the method including the steps of:

a) receiving analog signals generated by said integrated and said external microphones;

b) converting a signal from an integrated microphone and a signal from an external microphone, respectively, into digital signals;

c) dividing the digital signal from the integrated microphone into frequency sub-bands, and thus obtaining integrated microphone sub-band signals;

d) dividing the digital signal from the external microphone into frequency sub-bands, and thus obtaining external microphone sub-band signals;

e) in each frequency sub-band, computing a current spectral amplitude of the integrated microphone sub-band signal and a current spectral amplitude of the external microphone sub-band signal;

f) computing the ratio of the current spectral amplitude of the external microphone sub-band signal to the current spectral amplitude of the integrated microphone sub-band signal;

g) modifying the integrated microphone sub-band signal according to the calculated ratio;

h) synthesizing a full-band output signal from the integrated microphone sub-band signals.

2. The method according to claim 1, wherein modifying the integrated microphone sub-band signal includes attenuating this signal in each sub-band in which said ratio of the current spectral amplitudes exceeds an attenuation threshold.

3. The method according to claim 2, wherein the attenuation threshold is predefined.

4. The method according to claim 2, wherein the attenuation threshold is calculated dynamically.

5. The method according to claim 1, wherein modifying the integrated microphone sub-band signal includes mixing this signal with the external microphone sub-band signal in each sub-band in which said ratio of the current spectral amplitudes exceeds a substitution threshold.

6. The method according to claim 5, wherein the integrated microphone sub-band signal and the external microphone sub-band signal are mixed by a mixing coefficient calculated according to the ratio of the current spectral amplitudes, and the substitution threshold.

7. The method according to claim 5, wherein the substitution threshold is predefined.

8. The method according to claim 6, wherein the substitution threshold is predefined.

9. The method according to claim 5, wherein the threshold is calculated dynamically.

10. The method according to claim 6, wherein the threshold is calculated dynamically.

11. The method according to claim 2, wherein, in parallel with the attenuation, the integrated microphone sub-band signal is mixed with the external microphone sub-band signal.

12. The method according to claim 11, wherein the signals are mixed by a mixing coefficient calculated according to the ratio of the current spectral amplitudes, and a substitution threshold.

13. The method according to claim 12, wherein the substitution threshold is predefined.

14. The method according to claim 12, wherein the substitution threshold is calculated dynamically.

15. The method according to claim 1, wherein the sub-band signals are generated by means of a filter bank.

16. The method according to claim 1, wherein the sub-band signals are generated by means of Short Time Fourier Transform.

17. The method according to claim 1, wherein at least one additional microphone is integrated in the handheld unit, a signal from the additional integrated microphone being subjected to operations identical to those which the signal from the integrated microphone is subjected to.

18. The method according to claim 1, wherein the external microphone is included in a headset connected to the handheld unit.

19. The method according to claim 18, wherein the headset is connected to the handheld unit by wireless connection.

20. A method of suppressing undesired noise in a hearing aid, said hearing aid comprising a handheld unit, in which a microphone is integrated, and another microphone located externally of the handheld unit and connected thereto, and a processor, the method including the steps of:

(a) receiving analog signals generated by said integrated and said external microphones (b) converting a signal from the integrated microphone and a signal from the external microphone, respectively, into digital signals;

(c) dividing the digital signal from the integrated microphone into frequency sub-bands, and thus obtaining integrated microphone sub-band signals;

(d) dividing the digital signal from the external microphone into frequency sub-bands, and thus obtaining external microphone sub-band signals;

(e) in each frequency sub-band, computing a current spectral amplitude of the integrated microphone sub-band signal and a current spectral amplitude of the external microphone sub-band signal;

(f) computing the ratio of the current spectral amplitude of the external microphone sub-band signal to the current spectral amplitude of the integrated microphone sub-band signal;

(g) modifying the integrated microphone sub-band signal according to the calculated ratio;

(h) synthesizing a full-band output signal from the integrated microphone sub-band signals, said steps (a)-(h) being performed by said processor.

* * * * *